(12) United States Patent
Ito et al.

(10) Patent No.: US 9,889,660 B2
(45) Date of Patent: *Feb. 13, 2018

(54) INK JET RECORDING METHOD USING A PRINTHEAD HAVING A PRESSURE CHAMBER CONNECTED TO A NOZZLE WITH A CONNECTION PORTION

(71) Applicant: Seiko Epson Corporation, Tokyo (JP)

(72) Inventors: Jun Ito, Shimosuwa (JP); Kenichiro Kubota, Matsumoto (JP); Naoki Koike, Matsumoto (JP); Keiji Iida, Chikuhoku (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,080

(22) Filed: Nov. 21, 2016

(65) Prior Publication Data

US 2017/0165966 A1    Jun. 15, 2017

(30) Foreign Application Priority Data

Dec. 9, 2015  (JP) ................................ 2015-239990

(51) Int. Cl.
*B41J 2/14* (2006.01)
*C09D 11/322* (2014.01)
*C09D 11/36* (2014.01)

(52) U.S. Cl.
CPC ......... *B41J 2/1433* (2013.01); *B41J 2/14233* (2013.01); *C09D 11/322* (2013.01); *C09D 11/36* (2013.01); *B41J 2202/11* (2013.01)

(58) Field of Classification Search
CPC ....... B41J 2/1433; C09D 11/322; C09D 11/36
See application file for complete search history.

(56) References Cited

U.S. PATENT DOCUMENTS 6,474,566 B1 * 11/2002 Hirota ................. B05B 17/0607
239/102.2
6,616,270 B1    9/2003 Miyata et al.
(Continued)

FOREIGN PATENT DOCUMENTS

JP    2003-231254 A    8/2003
JP    2008-208171 A    9/2008
JP    2013-071978 A    4/2013

*Primary Examiner* — Henok Legesse
(74) *Attorney, Agent, or Firm* — Harness, Dickey & Pierce, P.L.C.

(57) ABSTRACT

An ink jet recording method including causing ink to adhere to a recording medium by ejecting an ink composition using a print head provided with a nozzle, a pressure chamber, and a connection portion which connects the pressure chamber and the nozzle to each other at a length of 500 μm or more, in which the ink composition includes a coloring material and a solvent represented by General Formula (1) below at 30 mass % or more with respect to a total mass of the ink composition, $$R^1O—(R^2O)_n—R^3 \qquad (1)$$

(in General Formula (1), $R^1$ and $R^3$ each independently represent a hydrogen or an alkyl group with 1 to 5 carbon atoms and at least one of $R^1$ and $R^3$ is an alkyl group with 1 to 5 carbon atoms, $R^2$ represents an alkylene group with 2 to 4 carbon atoms, and n represents an integer of 1 to 6).

11 Claims, 3 Drawing Sheets

(56) References Cited

U.S. PATENT DOCUMENTS

| | | | | |
|---|---|---|---|---|
| 6,966,635 B2* | 11/2005 | Miyata | ................ | B41J 2/14233 347/70 |
| 2009/0239980 A1* | 9/2009 | Sugita | ................ | C09D 11/106 524/88 |
| 2013/0258017 A1* | 10/2013 | Kagose | ................ | B41M 7/0081 347/102 |
| 2013/0286121 A1* | 10/2013 | Fukumoto | ................ | B41J 2/01 347/102 |
| 2016/0222235 A1* | 8/2016 | Iida | ................ | C09D 11/322 |
| 2016/0237291 A1* | 8/2016 | Nagase | ................ | C09D 11/10 |

* cited by examiner

INK JET RECORDING METHOD USING A PRINTHEAD HAVING A PRESSURE CHAMBER CONNECTED TO A NOZZLE WITH A CONNECTION PORTION

BACKGROUND

1. Technical Field

The present invention relates to an ink jet recording method.

2. Related Art

In the related art, various types of print head have been developed and used as print heads for ejecting ink jet inks (also referred to below as "inks") used for recording using an ink jet recording system. In addition, solvent-based inks have been developed according to various solvent compositions for recording on low ink-absorbing or non-absorbing recording media.

For example, JP-A-2008-208171 discloses a solvent-based ink which combines a coloring agent, a resin, an aprotic polar organic solvent, and a glycol ether-based solvent in order to provide a solvent-based ink which may be used to print, on the surface of a vinyl chloride-based resin, images or letters having excellent water resistance, light resistance, abrasion resistance, and the like. In addition, JP-A-2013-71978 discloses a non-aqueous ink which includes a pigment and a hydrocarbon solvent with an object of providing a non-aqueous ink jet ink with a high print density, improved image quality by suppressing strike-through, and favorable ejection stability. Furthermore, JP-A-2003-231254 discloses an ink jet recording head and an ink jet recording apparatus with a simplified structure and a reduced manufacturing cost.

However, since the solvent-based ink and non-aqueous ink have a low boiling point, the inks described above tend to dry easily. Therefore, when the ink is ejected using a head with a structure in which a nozzle and a pressure chamber are directly connected as described in JP-A-2003-231254, the ink tends to dry from the nozzle surface, and the ejection stability may deteriorate due to clogging or the like.

For this reason, when the solid content of the ink composition is reduced in order to obtain an ink jet recording method with excellent ejection stability, the quality of the obtained image may deteriorate, or the printing characteristics such as scratch resistance and surface drying characteristics may deteriorate.

SUMMARY

An advantage of some aspects of the invention is to provide an ink jet recording method in which recorded material with excellent ejection stability and excellent printing characteristics such as scratch resistance and surface drying characteristics is obtained when a solvent-based ink is applied to a recording medium by an ink jet method.

The invention can be realized in the following aspects or application examples.

Application Example 1

According to an aspect of the invention, there is provided an ink jet recording method including causing ink to adhere to a recording medium by ejecting an ink composition by using a print head provided with a nozzle which ejects the ink composition, a pressure chamber for ejecting the ink composition from the nozzle by applying pressure to the ink composition, and a connection portion which connects the pressure chamber and the nozzle to each other, the length of the connection portion from a portion of the pressure chamber from which ink flows out to the nozzle side up to the nozzle is 500 μm or more, and the ink composition is a solvent-based ink jet ink composition including a coloring material and a solvent represented by General Formula (1) below at 30 mass % or more with respect to a total mass of the ink composition, $$R^1O-(R^2O)_n-R^3 \quad (1)$$

(in General Formula (1), $R^1$ and $R^3$ each independently represent a hydrogen or an alkyl group with 1 to 5 carbon atoms, and at least one of $R^1$ and $R^3$ is an alkyl group with 1 to 5 carbon atoms, $R^2$ represents an alkylene group with 2 to 4 carbon atoms, and n represents an integer of 1 to 6).

According to the ink jet recording method of Application Example 1, it is possible to provide an ink jet recording method with excellent ejection stability by preventing the ink from the nozzle surface from drying when a solvent-based ink is applied to the recording medium with an ink jet method. In addition, since it is possible to preserve the ejection stability at the time of ink adhesion, it is possible to increase the solid content of the ink composition, and it is possible to provide an ink jet recording method in which recorded material with excellent printing characteristics such as scratch resistance or surface drying characteristics is obtained.

Application Example 2

In the ink jet method according to the application example, the ink composition may include the solvent represented by General Formula (1) described above at 50 mass % or more.

Application Example 3

In the ink jet method according to the application example, the ink composition may further include a lactone as a solvent.

Application Example 4

In the ink jet method according to the application example, the ink composition may further include a fixing resin.

Application Example 5

In the ink jet method according to the application example, the ink composition may further include an alkylene glycol monoether compound where any one of $R^1$ and $R^3$ is a hydrogen as a solvent represented by General Formula (1).

Application Example 6

In the ink jet method according to the application example, the ink composition may include one type or more of a compound with a flash point of 70° C. or lower as a solvent which is a compound represented by General Formula (1).

Application Example 7

In the ink jet method according to the application example, the print head may be provided with rows formed of a plurality of nozzles for ejecting the ink composition, and nozzle density in the row direction may be 200 dpi or more.

Application Example 8

In the ink jet method according to the application example, the ink ejection amount per single ejection may be 30 ng or less.

Application Example 9

The ink jet method according to the application example may further include heating the recording medium such that a surface temperature of the recording medium is 30° C. or higher during the ink adhesion.

BRIEF DESCRIPTION OF THE DRAWINGS

The invention will be described with reference to the accompanying drawings, wherein like numbers reference like elements.

DESCRIPTION OF EXEMPLARY EMBODIMENTS

A description will be given below of several embodiments of the invention. The embodiment described below illustrates one example of the invention. The invention is not limited to the following embodiment and also includes various types of modifications implemented in a range in which the gist of the invention is not changed. Here, it is not the case that the entirety of configuration illustrated below is an essential configuration of the invention.

1. INK JET RECORDING METHOD

The ink jet recording method according to an embodiment of the invention includes causing ink to adhere to a recording medium by ejecting an ink composition by using a print head provided with a nozzle which ejects the ink composition, a pressure chamber for ejecting the ink composition from the nozzle by applying pressure to the ink composition, and a connection portion which connects the pressure chamber and the nozzle to each other, in which the length of the connection portion from a portion of the pressure chamber from which ink flows out to the nozzle side up to the nozzle is 500 μm or more, and the ink composition is a solvent-based ink jet ink composition including a coloring material and a solvent represented by General Formula (1) below at 30 mass % or more with respect to a total mass of the ink composition.

(in General Formula (1), $R^1$ and $R^3$ each independently represent a hydrogen or an alkyl group with 1 to 5 carbon atoms. However, at least one of $R^1$ and $R^3$ is an alkyl group with 1 to 5 carbon atoms. $R^2$ represents an alkylene group with 2 to 4 carbon atoms. n represents an integer of 1 to 6).

A description will be given of the configuration of an ink jet recording apparatus which is able to implement the ink jet recording method according to the present embodiment followed by a description of the ink composition, and a detailed description will be given of the steps of the method.

1.1. Apparatus Configuration

As described above, the ink jet recording apparatus of the present embodiment is provided with a print head provided with a nozzle which ejects an ink composition; a pressure chamber for ejecting the ink composition from the nozzle by applying pressure to the ink composition; and a connection portion which connects the pressure chamber and the nozzle to each other, the length of the connection portion from a portion of the pressure chamber from which ink flows out to the nozzle side up to the nozzle is 500 μm or more.

A description will be given of the ink jet recording apparatus of the present embodiment by using an on-carriage type printer, on which an ink cartridge is mounted on a carriage, as an example; however, the ink jet recording apparatus of the present embodiment is not limited to an on-carriage type printer and may be an off-carriage type printer in which an ink cartridge is not mounted on a carriage and is fixed externally.

In addition, the printer described in the following explanation is a serial printer in which a print head is mounted on a carriage reciprocating in a predetermined direction and which ejects liquid droplets on a recording medium by moving the head along with the movement of the carriage; however, the printer is not limited to a serial printer and may be a line printer in which a head is formed to be wider than the width of the recording medium and which ejects liquid droplets onto the recording medium without moving the print head.

In each of the drawings referenced in the following description, the scale of each of the members is changed as appropriate in order to present each member at a recognizable size.

Figure 1:
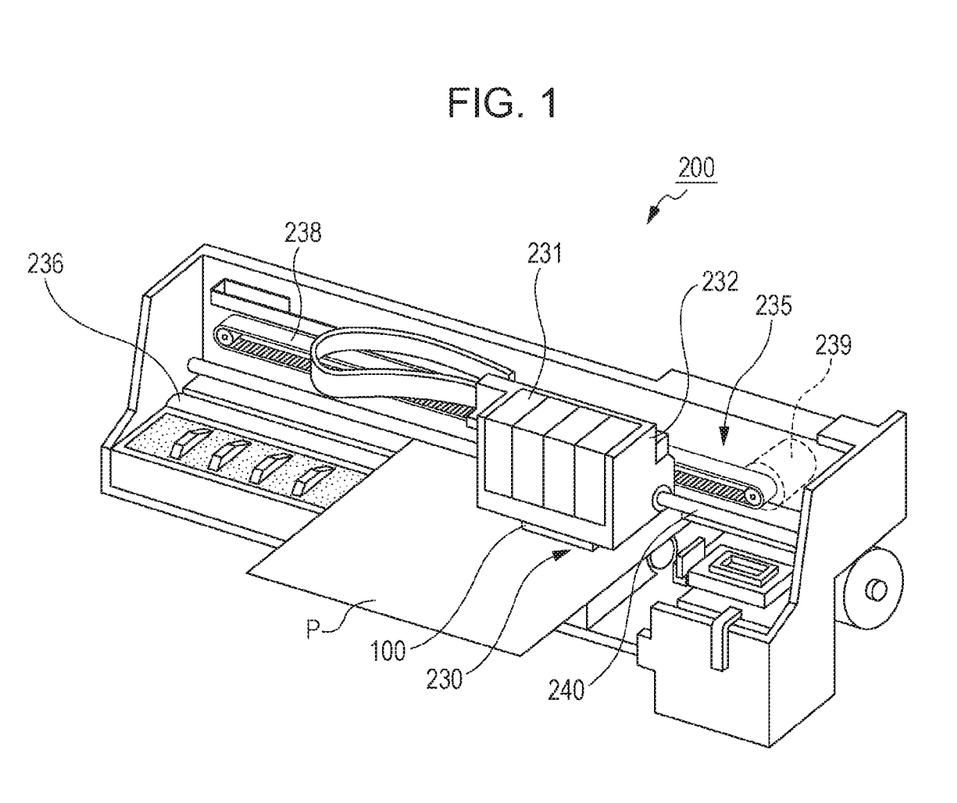
FIG. 1 is a schematic perspective view of an ink jet recording apparatus according to an embodiment.

FIG. 1 is a schematic perspective view which illustrates a printer 200 as an example of an ink jet recording apparatus of the present embodiment, the printer 200 performing ink jet recording on a recording medium P.

As shown in FIG. 1, the printer 200 has a print head 100, a carriage 232 on which the print head 100 is mounted and the ink cartridge 231 is detachably mounted, a main scanning mechanism 235 for reciprocating the carriage 232 in the medium width direction, and a platen roller 236 for transferring the recording medium P in a media feeding direction. The printer 200 further has a control portion (not shown) which controls the operations of the entire printer 200. Here, the medium width direction is the main scanning direction (the head scanning direction) and the media feeding direction is the sub-scanning direction (a direction perpendicular to the main scanning direction).

The main scanning mechanism 235 is provided with a timing belt 238 which is connected to the carriage 232, a motor 239 which drives the timing belt 238, and a guide shaft 240 which is a supporting member disposed in the main scanning direction. The carriage 232 is driven by the motor 239 via the timing belt 238 and reciprocates in the main scanning direction along the guide shaft 240. During this reciprocating movement, the ink is ejected at a predetermined timing from the print head 100, and printing is performed onto the recording medium P.

The head unit 230 has an ink jet recording head formed of the print head 100 (also referred to below simply as "head" or "print head"). The head unit 230 is further provided with the ink cartridge 231 which supplies ink to the print head 100 and a transport portion (carriage) 232 on which the print head 100 and the ink cartridge 231 are mounted.

In the present embodiment, an example is shown in which printing is performed while moving both the print head 100 and the recording medium P; however, the printer 200 may be a mechanism where printing is carried out onto the recording medium P by changing the relative position of either the print head 100 or the recording medium P.

Here, the illustrated printer 200 has one print head 100 and is able to perform printing onto the recording medium P by using the print head 100; however, the printer 200 may have a plurality of print heads. In a case where the printer 200 has a plurality of print heads, the plurality of print heads may each be operated independently as described above, or the plurality of print heads may be linked to each other to form a single assembled head. Examples of such an assembled head include a line-type head where the nozzle holes of each of the plurality of heads have a uniform spacing throughout.

1.1.1. Print Head

Figure 2:
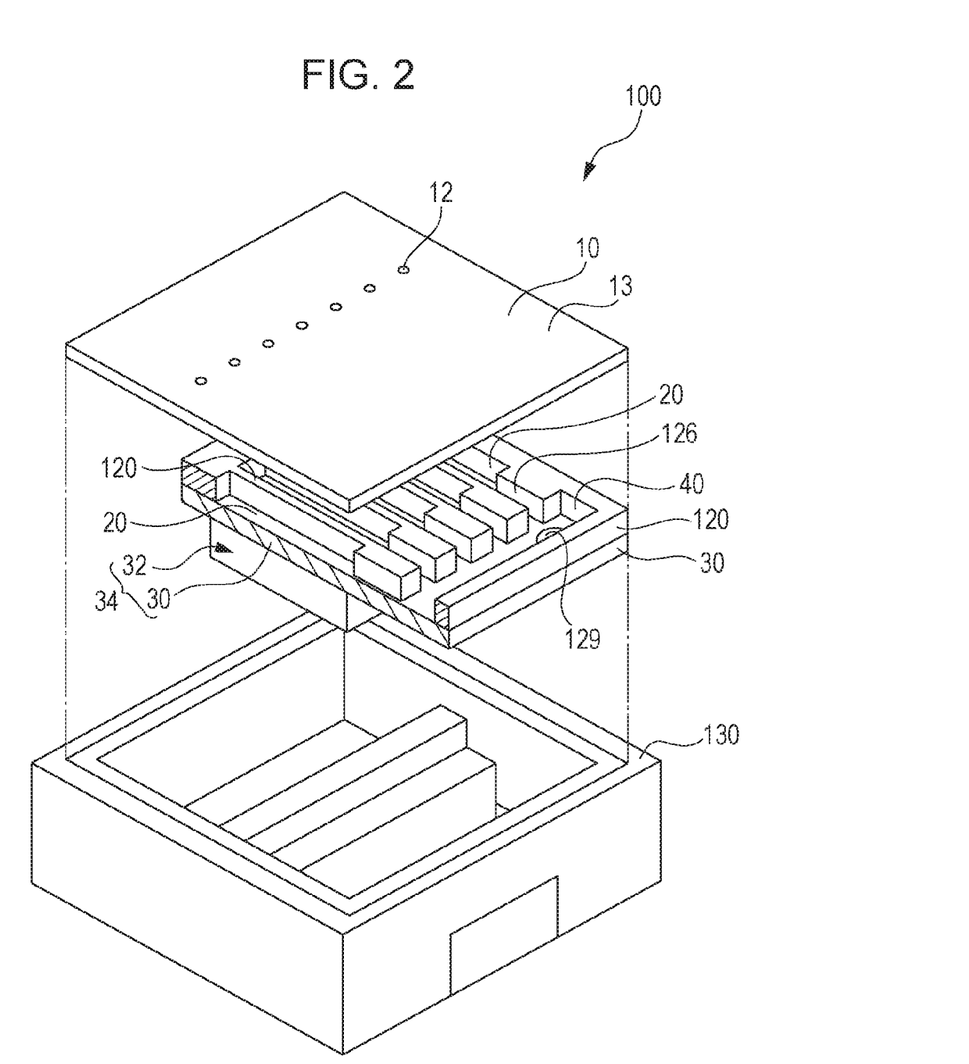
FIG. 2 is an exploded perspective view schematically showing a head according to the embodiment.
Figure 3:
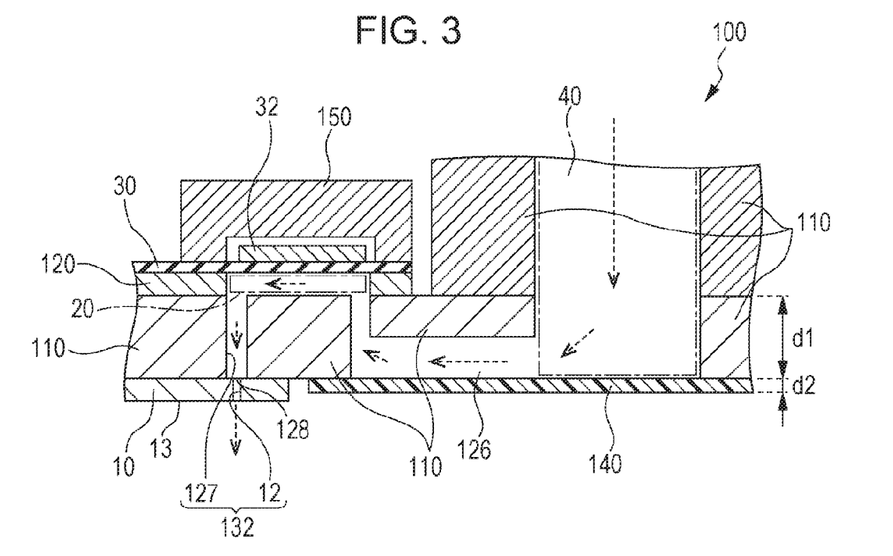
FIG. 3 is a schematic view of a cross-section of a main portion of a head according to the embodiment.

FIG. 2 is an exploded perspective view schematically showing the print head 100 of the printer 200 and the state in which it is mounted upside down on the printer 200 shown in FIG. 1. FIG. 3 is a sectional view of a cross-section of a main portion of the print head 100 in which the flow of the ink during the ejection operation of the ink from the ink supply chamber 40 up to the nozzle hole 12 is schematically denoted by dashed arrows.

In FIG. 2 and FIG. 3, a piezoelectric element 32 is illustrated in a simplified manner. In addition, in the present embodiment, the print head 100 is formed to be provided with a communication plate 110 and a cover 150; however, the communication plate 110 and cover 150 are omitted in FIG. 2.

As shown in FIG. 2, the print head 100 is provided with a nozzle plate 10 which has a plurality of nozzle holes 12 on a surface opposing the recording medium P, a plurality of pressure chambers 20 which communicate with each of the plurality of nozzle holes 12 formed in the nozzle plate 10, a vibration plate 30 which changes the volume of each of the plurality of pressure chambers 20, an ink supply chamber 40 which supplies ink to the plurality of pressure chambers 20, and a housing 130.

The nozzle plate 10 has a plurality of nozzle holes for ejecting ink, the plurality of nozzle holes 12 are arranged in rows, and a nozzle surface 13 is formed on the nozzle plate 10 surfaces. The number of the nozzle holes 12 provided in the nozzle plate 10 is not particularly limited. In the print head 100 of the present embodiment, it is preferable that the nozzle density of the nozzle holes 12 in the row direction be 200 dpi or more. That is, it is preferable that the spacing of the adjacent nozzle holes 12 of the arranged nozzle holes 12 be 127 µm or less. The nozzle density of 200 dpi or more enables the total ink ejection amount and the concealing property of the image to be maintained even in a case where the liquid droplets are reduced in size. It is more preferable that the nozzle density be 240 dpi or more, still more preferably 250 dpi or more, still more preferably 300 dpi or more, still more preferably 400 dpi or more, and most preferably 500 dpi or more. It is preferable that the upper limit of the nozzle density be 2,000 dpi or less, more preferably 1,000 dpi or less.

Examples of the material of the nozzle plate 10 include silicon, stainless steel (SUS), and the like. In addition, in a case where the material of the nozzle plate is an alloy which includes iron (Fe) as the main component (50% or more) and 10.5% or more of chromium (Cr), it is possible to satisfy both rigidity and rust resistance, which is more preferable. The thickness of the nozzle plate 10 is not particularly limited, and, for example, 50 µm or less is preferable, 20 µm or less is more preferable, and 1 µm or more and 10 µm or less is even more preferable.

The print head 100 is provided with pressure chamber substrate 120 for forming the pressure chamber 20, and examples of the material of the pressure chamber substrate 120 include silicon, or the like. As shown in FIG. 3, the pressure chamber substrate 120 is provided with a communication plate 110 as a flow path forming substrate between the nozzle plates 10. The ink supply chamber 40 (liquid storage portion), the supply port 126 communicating with the ink supply chamber 40, and the pressure chamber 20 communicating with the supply port 126 are formed by the communication plate 110 partitioning the space between the nozzle plate 10 and the pressure chamber substrate 120. That is, the ink supply chamber 40, the supply port 126, and the pressure chamber 20 are partitioned by the nozzle plate 10, the communication plate 110, the pressure chamber substrate 120, and the vibration plate 30.

The communication plate 110 has the communication holes 127 which extend from the pressure chamber 20 to the nozzle hole 12. In the end portion of the communication hole 127 formed in the surface where the communication plate 110 abuts the nozzle plate 10, an ink ejection port 128 is formed. The ejection port 128 communicates with the nozzle hole 12 formed in the nozzle plate 10.

The vibration plate 30 is provided abutting the pressure chamber substrate 120, and a piezoelectric element is formed to abut the vibration plate 30. The piezoelectric element 32 is electrically connected to a piezoelectric element driving circuit (not shown) and can be operated (vibrated or changed in shape) in accordance with a signal from the piezoelectric element driving circuit. The vibration plate 30 changes shape according to the operation of the piezoelectric element 32 and it is possible to change the internal pressure of the pressure chamber 20 by changing the volume of the pressure chamber 20. The piezoelectric element 32 is not particularly limited, and examples of the piezoelectric element 32 include types of element (electromechanical transducer elements) which generate changes in shape according to the application of a voltage. In this manner, in the present embodiment, the piezoelectric actuator 34 is formed by the piezoelectric element 32 and the vibration plate 30.

Here, in this example, the pressure chamber 20 is partitioned by the communication plate 110, the pressure chamber substrate 120, and the vibration plate 30; however, it is possible to form the pressure chamber 20 by using appropriate members as long as it is possible to change the volume according to the vibration of the vibration plate 30, and for this reason the number, shape, material, and the like of the members are arbitrary. In addition, the vibration plate 30 may be integral with an electrode (for example, formed of Pt or the like) which forms the piezoelectric element 32.

Since the print head 100 of the present embodiment has a spacing between the nozzle holes 12 of 127 µm or less, it is preferable that the piezoelectric element 32 be formed with a piezoelectric material arranged between two electrodes. That is, it is preferable that the piezoelectric actuator 34 be in a thin-film form throughout in which, for example, one electrode, a layer of piezoelectric material (for example, lead zirconate titanate (PZT)), and the other electrode are sequentially stacked with respect to the vibration plate 30.

Although there is no particular limitation on the material of the vibration plate 30, examples of the material include silicon oxide ($SiO_2$), silicon nitride (SiN), silicon oxynitride (SiON), zirconium oxide ($ZrO_2$), titanium oxide ($TiO_2$), silicon carbide (SiC), and stacked bodies of layers formed of these materials or the like. The material of the vibration plate 30 more preferably has a Young's modulus of 250 Gpa or less, from the point of being able to increase the displacement and the point of damage being less likely to occur, for example, being formed to include $ZrO_2$ (150 GPa), $SiO_2$ (75 GPa), Si (130 GPa), SUS (199 GPa), or Cr (248 GPa) is more preferable (values in parentheses denote Young's modulus). In addition, in a case where the electrodes of the piezoelectric element 32 are formed of Pt and integrally stacked with the vibration plate 30, since Young's modulus of the Pt is 168 GPa and of the $ZrO_2$ is 150 GPa, even when combined, Young's modulus is 250 GPa or less, so such a configuration may be used.

Here, in the present specification, Young's modulus refers to Young's modulus as measured in a static test (JIS G0567J and the like, mechanical testing), for example, measured using a No. II-6 specimen.

Furthermore, the print head 100 is provided with a compliance sheet 140, and the cover 150 for accommodating piezoelectric elements 32 as members forming part of the ink flow path. The compliance sheet 140 forms a supply port 126 communicating with the ink supply chamber 40 between the communication plates 110. In addition, the compliance sheet 140 is a flexible elastic film that functions as a damper for ejecting and distributing the ink and suppresses damage to the print head 100 due to deformation in a case where the volume increases due to the ink expanding.

The compliance sheet 140 is not particularly limited as long as it is a film having elasticity, and, for example, polymer film, metals formed into a thin film, glass fiber, carbon fiber, or the like may be used. The material of the polymer film is not particularly limited, and examples of the material include polyimide, nylon, polyolefin, polyphenylene sulfite, and the like, and it is more preferable that the material be formed of polyphenylene sulfite. In addition, examples of the metal include materials including iron or aluminum.

The thickness of the compliance sheet 140 is not particularly limited, and, for example, 50 µm or less is preferable, 20 µm or less is more preferable, and 1 µm or more and 10 µm or less is still more preferable. When the compliance sheet 140 is made to be an excessively thin film, the vibration is increased at the time of ink ejection and residual vibration may be generated in large amounts.

In the present embodiment, a description is given in which the ink supply chamber 40, the supply port 126, the pressure chamber 20, and the communication hole 127 are partitioned; however, all of the above constitute the liquid flow path, and the flow path may be designed in any manner as long as the pressure chamber 20 is formed. For example, in the illustrated example, a part of the flow path that is narrowed serves as the supply port 126; however, the scale of the flow path can be determined arbitrarily in accordance with the design and is not necessarily an essential part of the configuration.

The pressure chamber 20 formed in accordance with the configuration described above is a space partitioned by the communication plate 110, the pressure chamber substrate 120, and the vibration plate 30 and refers to a space in which the supply port 126, the communication hole 127, the ejection port 128, and the nozzle hole 12 are not included. That is, the pressure chamber 20 is formed by a first space opposing the portion to which pressure is applied to the ink (portion where the wall of the pressure chamber 20 changes shape or is heated), such as the vibration plate 30, the pressure chamber substrate 120, and the communication plate 110 and a second space adjacent to the first space and where the cross-sectional area of the cross-section with respect to the direction in which the ink moves is equal to the first space, and the volume of the pressure chamber 20 is the volume of the first and second spaces. In this manner, the pressure chamber 20 is a space in which the volume is changed by displacement of the vibration plate 30 and the pressure chamber 20 is defined as a space which does not include a narrowed flow path or the like communicating with the space of the pressure chamber 20.

As described above, the communication hole 127 extends from the pressure chamber 20 to the nozzle hole 12. In the present embodiment, the portions from the portion from which the ink flows out to the nozzle side up to the nozzle, that is, in the example of FIG. 3, the communication hole 127, the nozzle hole 12, and the portion connecting all of the communication hole 127 and the nozzle hole 12 are defined as the connection portion 132. Accordingly, in the example of FIG. 3, since the connection portion 132 is provided so as to penetrate the communication plate 110 in the thickness direction, the length of the connection portion 132 is equal to the sum of the thickness d1 of the communication plate 110 in the thickness direction and the thickness d2 of the nozzle plate 10 in the thickness direction.

In the present embodiment, the sum of the thickness d1 of the communication plate 110 in the thickness direction and the thickness d2 of the nozzle plate 10 in the thickness direction, in other words, d1+d2, is 500 µm or more. In this manner, by configuring the length of the connection portion 132 to be long, it is possible to prevent the drying of the ink from the nozzle surface 13 and it is possible to ensure ejection stability. Due to this, it is possible to increase the content of the solids in the ink composition, and recorded material where the color development is excellent and the printing characteristics such as the scratch resistance and the surface drying characteristics are excellent is obtained.

Here, in the example shown in FIG. 3, the communication plate 110 is stacked on the nozzle plate 10 and the nozzle hole 12 and the communication hole 127 are formed with different members; however, the nozzle plate and the communication plate may be formed with a single member. Even in a case where the nozzle plate and the communication plate are formed with a single member, the connection portion 132 is a portion from a portion where the ink flows out from the pressure chamber to the nozzle side up to the nozzle. In such a case, by the length of the connection portion being 500 µm or more, it is possible to prevent the drying of the ink from the nozzle surface.

It is preferable that the length of the connection portion 132 be 500 µm or more and 3,000 µm or less, more preferably 700 µm or more and 2,500 µm or less, and even more preferably 900 µm or more and 1,500 µm or less. Here, even in a case where the communication hole extends at an angle with respect to the nozzle plate 10, the length of the communication hole is the length along the communication hole and, in this case, is longer than the thickness d1 of the communication plate 110 in the thickness direction. That is, the shortest distance from the boundary of the communication hole with the pressure chamber 20 up to the nozzle hole 12 through the middle of the communication hole is the length of the communication hole and the length of the connection portion is a length obtained by adding the length of the nozzles 12 and all of the portions connecting to these to the length of the communication hole.

It is preferable that the total of the volume of the pressure chamber and the connection portion per pressure chamber, in other words, in the present embodiment, the total of the volume of the pressure chamber 20, the communication hole 127, and the nozzle holes 12 be 4,200 pl or more and 6,200 pl or less, more preferably 4,500 pl or more and 5,500 pl or less. In such a case, it is possible to further prevent the drying of the ink from the nozzle surface 13.

In such a case, it is preferable that the volume per pressure chamber 20 be 3,700 pl or less, more preferably 3,500 pl or less. Furthermore, it is still more preferable that the volume is 3,300 pl or less and still more preferably 3,000 pl or less. It is preferable that the lower limit of the volume per pressure chamber 20 be 1,500 pl or more, more preferably 2,000 pl or more. The volume of the pressure chamber 20 being 3,700 pl or less makes it possible to sufficiently ensure the volume of the communication hole 127, thus it is possible to effectively prevent the drying of the ink from the nozzle surface 13.

The ink supply chamber 40 is able to temporarily store the ink supplied through the through hole 129 provided in the vibration plate 30 from outside (for example, from an ink cartridge). The ink in the ink supply chamber 40 is able to be supplied to the pressure chamber 20 via the supply port 126. The pressure chamber 20 changes the volume by changing the shape of the vibration plate 30. The pressure chamber 20 communicates with the nozzle hole 12 via the communication hole 127 and it is possible to eject ink from the nozzle hole 12 or introduce ink from the ink supply chamber 40 to the pressure chamber 20 by changing the volume of the pressure chamber 20. Here, from the point of making the image quality excellent and the point of ensuring intermittency, it is preferable that the nozzle diameter of the nozzle holes 12 be 5 μm or more and 100 μm or less, more preferably 10 μm or more and 60 μm or less, and still more preferably 10 μm or more and 40 μm or less.

As shown in FIG. 2, the housing 130 is able to store the nozzle plate 10, the pressure chamber substrate 120, and the piezoelectric element 32. Examples of the material of the housing 130 include resin, metal, and the like. The housing 130 may have a function of separating the piezoelectric element 32 from the external environment. In addition, inert gas or the like may be sealed in the housing 130 and the interior of the housing 130 may be depressurized and, due to this, it is possible to suppress deterioration or the like of the piezoelectric material.

The cover 150 is formed as a separate member to the housing 130. The cover 150 is provided to abut the vibration plate 30, a space which accommodates the piezoelectric element 32 is formed, and the piezoelectric element 32 is accommodated in this space. The material of the cover 150 is the same as the material of the housing 130 described above. The housing 130 described above is a cover which covers the piezoelectric element 32 and the cover 150 may have a function of separating the piezoelectric element 32 from the external environment, and inert gas or the like may be sealed in the space formed by the cover 150 or the space may be depressurized. Due to this, it is possible to suppress deterioration or the like of the piezoelectric material of the piezoelectric element 32. In such a case, the housing 130 may function as a support for the print head 100.

In a case where the print head 100 used in the present embodiment illustrated above is mounted on the printer 200, the nozzle plate 10 is arranged toward the recording medium P and the nozzle plate 10 directly abuts the atmosphere (outside air). In addition, since the print head 100 used in the present embodiment has the housing 130 and the cover 150, the piezoelectric element 32 and the vibration plate 30 have a structure which substantially does not come into contact with outside air.

Here, the ink jet recording apparatus used in the present embodiment executes an ink jet recording method using the ink composition described below (also referred to below as "ink").

1.2. Ink Composition

The ink composition used in the ink jet recording method according to an embodiment of the invention is a solvent-based ink jet ink composition including a coloring material and a solvent represented by General Formula (1) below at 30 mass % or more with respect to the total mass of the ink composition.

$$R^1O-(R^2O)_n-R^3 \qquad (1)$$

(in General Formula (1), $R^1$ and $R^3$ each independently represent a hydrogen or an alkyl group with 1 to 5 carbon atoms. At least one of $R^1$ and $R^3$ is an alkyl group with 1 to 5 carbon atoms. $R^2$ represents an alkylene group with 2 to 4 carbon atoms. n represents an integer of 1 to 6).

A detailed description will be given of components included the ink composition (also referred to below simply as "ink") used in the ink jet recording method according to the present embodiment.

1.2.1. Compound Represented by General Formula (1)

The ink composition includes the compound represented by General Formula (1) described above as the main solvent (first solvent). In General Formula (1), the "alkyl group with 1 to 5 carbon atoms" in $R^1$ and $R^3$ can be a straight-chain or branched alkyl group and specific examples of this group include a methyl group, an ethyl group, an n-propyl group, an iso-propyl group, an n-butyl group, a sec-butyl group, a tert-butyl group, an n-pentyl group, an iso-pentyl group, and a tert-pentyl group. In addition, examples of the "alkylene group with 2 to 4 carbon atoms" in $R^2$ include an ethylene group, an n-propylene group, an isopropylene group, a butylene group, and the like.

The compound illustrated by General Formula (1) described above is an alkylene glycol alkyl ether and is excellent in the points of the drying property on the recording medium and the like. Specific examples of the compound represented by General Formula (1) described above include glycol ethers such as alkylene glycol monoether and alkylene glycol diether. The glycol ethers may be used alone or in a combination of two or more types.

Here, regarding the compound represented by General Formula (1) described above, a compound where $R^1$ and $R^3$ are each independently alkyl groups is an alkylene glycol diether and a compound where only one of $R^1$ and $R^3$ is set as an alkyl group is an alkylene glycol monoether. Among these, in terms of the drying properties of the ink and the like, it is preferable that the compound which is illustrated by General Formula (1) described above be an alkylene glycol diether.

Examples of the alkylene glycol monoether include ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, pentaethylene glycol monomethyl ether, pentaethylene glycol monoethyl ether, pentaethylene glycol monobutyl ether, propylene glycol monomethyl ether, propylene glycol monoethyl ether, dipropylene glycol monomethyl ether, dipropylene glycol monoethyl ether, and the like.

Examples of alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and the like.

The content of the solvent which is a compound represented by General Formula (1) included in the ink composition has a lower limit of 30 mass % or more with respect to the total mass (100 mass %) of the solvent-based ink jet ink composition, preferably 50 mass % or more and more preferably 60 mass % or more. In addition, it is preferable that the upper limit be 95 mass % or less, more preferably 90 mass % or less, even more preferably 85 mass % or less, still more preferably 80 mass % or less, and particularly preferably 75 mass % or less. When the content is 30 mass % or more, recorded material with excellent printing characteristics such as scratch resistance or surface drying characteristics is obtained. In addition, by the content being 95 mass % or less, the image is prevented from being stained by the generation of mist or the like.

In addition, from the point of view of further improving the printing characteristics such as scratch resistance or surface drying characteristics and the print quality, as the solvent which is the compound represented by General Formula (1) described above, it is preferable that one type or more of a compound with a flash point of 70° C. or lower be included, more preferably a flash point of 65° C. or lower, and still more preferably a flash point of 60° C. or lower. It is preferable that the content of the compound with a flash point of 70° C. or lower with respect to the total amount of the ink composition (the total amount in a case of using a plurality of types) be 10 mass % or more and 90 mass % or less, more preferably 20 mass % or more and 80 mass % or less, and particularly preferably 40 mass % or more and 70 mass % or less. Here, the lower limit of the flash point is not limited, but is preferably 50° C. or higher.

1.2.2. Lactone (Cyclic Ester)

The ink composition used in the present embodiment may contain a lactone (cyclic ester) as a solvent. Including a lactone in the ink composition makes it possible to make the ink composition permeate to the inside of the recording medium by dissolving a portion of the recording surface (for example, a recording surface including a vinyl chloride resin) of the recording medium. The ink permeating to the inside of the recording medium makes it possible to improve the scratch resistance (friction fastness) of the image recorded onto the recording medium. In other words, since the lactone has a high affinity with the vinyl chloride resin, the components of the solvent-based ink composition easily penetrate (easily bite into) the recording surface. As a result of the lactone having such an action, it is considered that the ink composition in which the lactone is blended is able to form an image with excellent scratch resistance even under severe conditions such as outdoor environments.

The lactone is a compound having a structure in which, in one molecule having a hydroxyl group and a carboxyl group, the hydroxyl group and the carboxyl group in the molecule are subjected to dehydration condensation. The cyclic ester is a compound which has a structure which has a heterocyclic ring including two or more carbon atoms and one oxygen atom, and in which the carbonyl group is arranged adjacent to the oxygen atom forming the heterocyclic ring.

Examples of lactones having a simple structure include β-propiolactone, β-butyrolactone, γ-butyrolactone, γ-valerolactone, γ-caprolactone, σ-valerolactone, and ε-caprolactone, or the like. Here, there is no particular limitation on the number of ring members of the heterocyclic ring of the lactone, further, for example, an arbitrary side chain may be joined to the ring member of a heterocyclic ring. The lactone may be used alone or may be used as a mixture of two or more types.

From the point of view of further increasing the scratch resistance of the image formed by the ink composition used in the present embodiment, among the lactones described above, a lactone with a 3-membered ring to a 7-membered ring is preferable, a lactone with a 5-membered ring to a 6-membered ring is more preferably used, and it is preferable not to have a side chain in any case. Specific examples of such lactones include β-butyrolactone, γ-butyrolactone, and γ-valerolactone. In addition, since such lactones have a particularly high affinity with polyvinyl chloride, it is possible to obtain a remarkably powerful effect of increasing the scratch resistance in a case of being adhered to a recording medium which contains polyvinyl chloride.

In a case of blending the lactone, the content with respect to the total amount of the solvent-based ink jet ink composition (the total amount of all types in a case of using a plurality of types) is 5 mass % or more and 50 mass % or less, preferably 7 mass % or more and 30 mass % or less, and even more preferably 10 mass % or more and 20 mass % or less.

1.2.3. Other Solvents

The ink composition used in the present embodiment is able to use a compound such as the following as the solvent in addition to the compound represented by General Formula (1) or the lactone described above.

Examples of such solvents may include the solvent which is a compound represented by General Formula (2) below as a second solvent in addition to the solvent represented by General Formula (1) described above as the main solvent (the first solvent).

$$R^4O-(R^5O)_n-R^6 \qquad (2)$$

(in General Formula (2), $R^4$ and $R^6$ each independently represent a hydrogen or an alkyl group with 1 to 6 carbon atoms. However, at least one of $R^4$ and $R^6$ is an alkyl group with 1 to 6 carbon atoms. $R^5$ represents an alkylene group with 2 to 4 carbon atoms. n represents an integer of 1 to 10).

By including the solvent which is the compound represented by General Formula (2) described above as the second solvent, it is possible to adjust the rate of moisture absorption and the drying property of the ink composition.

Here, it is possible for the "alkyl group with 1 to 6 carbon atoms" in $R^4$ and $R^6$ to be a straight-chain or branched alkyl group and examples of this group include a methyl group, an ethyl group, an n-propyl group, an iso-propyl group, an n-butyl group, a sec-butyl group, a tert-butyl group, a pentyl group, a hexyl group, and the like and it is preferable that one of $R^4$ or $R^6$ be a hydrogen and the other be an alkyl group with 1 to 6 carbon atoms.

In addition, in General Formula (2) described above, examples of "the alkylene group with 2 to 4 carbon atoms" in $R^5$ include an ethylene group, an n-propylene group, an isopropylene group, a butylene group, and the like. Furthermore, in General Formula (2) described above, it is preferable that n be an integer of 3 or more and 6 or less.

Specific examples of the solvent which is a compound represented by General Formula (2) described above include glycol ethers such as alkylene glycol monoether and alkylene glycol diether. These compounds can be used alone or in a combination of two or more types.

Examples of alkylene glycol monoethers include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, diethylene glycol monobenzyl ether, triethylene glycol monomethyl ether, triethylene glycol monoethyl ether, triethylene glycol monobutyl ether, tetraethylene glycol monomethyl ether, tetraethylene glycol monoethyl ether, tetra ethylene glycol monobutyl ether, pentaethylene glycol monomethyl ether, pentaethylene glycol monoethyl ether, pentaethylene glycol monobutyl ether, propylene glycol monomethyl ether, propylene glycol monoethyl ether, dipropylene glycol monomethyl ether, dipropylene glycol monoethyl ether, and the like.

Examples of alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetra ethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and the like.

It is preferable that the solvent which is a compound represented by General Formula (2) described above be an alkylene glycol monoether compound. In addition, from the point of view of improving the drying property of the ink composition and the scratch resistance and further improving the printing quality, it is preferable that a compound with a flash point of 180° C. or lower be contained as the solvent which is the compound represented by General Formula (2) described above. It is preferable that the content of the compound with a flash point of 180° C. or lower with respect to the total amount of the ink composition (the total amount of all types in a case of using a plurality of types) be 1 mass % or more and 20 mass % or less, more preferably 3 mass % or more and 15 mass % or less, and particularly preferably 5 mass % or more and 10 mass % or less. In addition, as the solvent which is a compound represented by General Formula (2) described above, it is more preferable that the flash point be 75° C. or higher, still more preferably 120° C. or higher.

Here, regarding the compound represented by General Formula (2) described above, a compound where $R^4$ and $R^6$ are each independently alkyl groups is an alkylene glycol diether and a compound where only one of $R^4$ and $R^6$ is set as an alkyl group is an alkylene glycol monoether.

In the present embodiment, it is preferable that the ink composition include an alkylene glycol monoether as a solvent which is a compound represented by General Formula (2) described above from the point of view of being further superior in the wet-spreading and printing characteristics. In addition, it is preferable that the content of the alkylene glycol monomethyl ether with respect to the total amount of the ink composition be 1 mass % or more and 20 mass % or less, more preferably 3 mass % or more and 15 mass % or less, and particularly preferably 5 mass % or more and 10 mass % or less.

In addition, examples of other solvent include alcohols (methyl alcohol, ethyl alcohol, propyl alcohol, butyl alcohol, isopropyl alcohol, fluorinated alcohol, and the like), ketones (acetone, methyl ethyl ketone, cyclohexanone, or the like), carboxylic acid esters (methyl acetate, ethyl acetate, propyl acetate, butyl acetate, methyl propionate, ethyl propionate, or the like), ethers (diethyl ether, dipropyl ether, tetrahydrofuran, dioxane, or the like), polyhydric alcohols (ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylol ethane, trimethylol propane, or the like), and the like.

In addition, (polyvalent) alcohols may be contained as the other solvents. Examples of the (polyvalent) alcohols include glycerin, propylene glycol, dipropylene glycol, 1,2-butanediol, 1,2-pentanediol, 1,2-hexane diol, 1,2-heptanediol, 3-methyl-1,3-butanediol, 2-ethyl-2-methyl-1,3-propanediol, 2-methyl-1,3-propanediol, 2-methyl-2-propyl-1,3-propanediol, and 2,2-dimethyl-1,3-propanediol, 2-methylpentane-2,4-diol, and the like.

From the point of view of the effect of reducing the density unevenness by improving the wet-spreading property and permeability on the recording medium and ensuring the storage stability and ejection reliability, it is preferable that the total content in a case where a (polyvalent) alcohol or the like be contained in the ink composition is 0.05 mass % or more and 30 mass % or less with respect to the total mass of the ink composition, more preferably 0.1 mass % or more and 20 mass % or less. Due to the content of the (polyvalent) alcohol being in the ranges described above, the wettability, the permeability, and the drying property of the ink are good, and an image provided with favorable print density (color developing property) may be obtained. In addition, by the content of the (polyvalent) alcohol or the like being in the range described above, it is possible to appropriately set the ink viscosity and it may be possible to reduce the generation of clogging or the like of the nozzle.

In addition, amines may be blended in the ink composition and examples of the amines include hydroxyl amines such as triethanolamine, tripropanolamine, tributanolamine, N,N-dimethyl-2-amino ethanol, and N,N-diethyl-2-amino ethanol, and it is possible to use one type or a plurality of types. It is preferable that the total content in a case of containing amines be 0.05 mass % or more and 5 mass % or less with respect to the total mass of the ink composition, more preferably 0.1 mass % or more and 3 mass % or less.

In addition, examples of solvents include higher fatty acid esters such as methyl laurate, isopropyl hexadecanoate (isopropyl palmitate), isopropyl myristate, methyl oleate, and ethyl oleate; dibasic acid diesters in which a dicarboxylic acid of an aliphatic hydrocarbon with 2 to 8 carbon atoms (the carbon number excludes the carbon of the carboxyl groups) is diesterified using an alkyl group with 1 to 5 carbon atoms; alkyl amides (N,N-dimethyldecanamide or the like) in which a monocarboxylic acid of an aliphatic hydrocarbon with 6 to 10 carbon atoms (the carbon number excludes the carbon of the carboxyl groups) is amidated (the substituent groups substituting for the amide nitrogen atoms each independently represent a hydrogen atom or an alkyl group with 1 to 4 carbon atoms), or the like.

Other solvents exemplified here can be added in an appropriate blend as one type or a plurality of types with respect to the ink composition.

1.2.4. Coloring Material

The ink composition used in the present embodiment includes a coloring material. As the coloring material, a pigment or dye such as an inorganic or organic pigment commonly used in solvent-based inks in the related art can be used alone or in combination. Examples of the organic pigment include azo pigments (for example, azo lakes, insoluble azo pigments, condensed azo pigments, chelate azo pigments, or the like), polycyclic pigments (phthalocyanine pigments, perylene and perylene pigments, anthraquinone pigments, quinacridone pigments, dioxazine pigments, thioindigo pigments, isoindolinone pigments, quinophthalone pigments, or the like), dye lakes (for example, basic dye lakes, acidic dye lakes, or the like), nitro pigments, nitroso pigments, aniline black, daylight fluorescent pigments, and the like. In addition, examples of the inorganic pigments include carbon black, titanium dioxide, silica, alumina, and the like. As the dyes, for example, it is possible to use azo dyes, metal complex dyes, naphthol dyes, anthraquinone dyes, indigo dyes, carbonium dyes, quinonimine dyes, xanthine dyes, cyanine dyes, quinoline dyes, nitro dyes, nitroso dyes, benzoquinone dyes, naphthoquinone dyes, phthalocyanine dyes, or metal phthalocyanine dyes, and oil-soluble dyes are particularly preferable. It is also possible to use these pigments or dyes alone or in a combination of two or more types of pigments and dyes, and pigments are preferable from the point of view of weather resistance. The volume average particle diameter of the pigment primary particles is 50 to 500 nm, preferably 50 to 200 nm.

The content of the coloring material can be appropriately set as desired and is not particularly limited; however, the content is normally 0.1 mass % or more and 10 mass % or less with respect to the total mass of the ink composition, preferably 0.5 mass % or more and 8 mass % or less, and more preferably 1 mass % or more and 6 mass % or less. Due to the content of the coloring material being in the range described above, the coloring property is excellent and the image formed by the ink composition has favorable weather resistance.

In addition, in the case of using a pigment as the coloring material, a pigment dispersing agent may be contained and a normal solvent-based ink, in particular, an arbitrary dispersing agent used in a solvent-based ink for ink jet recording, can be used. As the dispersing agent, it is preferable that a dispersing agent which effectively acts when the solubility parameter of the organic solvent is 8 to 11 be used. As such a dispersing agent, it is possible to use commercially available products and specific examples of such products include polyester-based polymer compounds such as Hinoact KF1-M, T-6000, T-7000, T-8000, T-8350P, and T-8000E (all produced by Takefu Fine Chemicals Co., Ltd.), Solsperse 20000, 24000, 32000, 32500, 33500, 34000, 35200, and 37500 (all produced by Lubrizol Corporation), Disperbyk-161, 162, 163, 164, 166, 180, 190, 191, 192, 2091, and 2095 (all produced by BYK Japan Co., Ltd.), Flowlen DOPA-17, 22, 33, and G-700 (all produced by Kyoeisha Chemical Co., Ltd.), AJISPER PB821 and PB711 (both produced by Ajinomoto Co., Inc.), LP4010, LP4050, and LP4055, and POLYMER400, 401, 402, 403, 450, 451, and 453 (all produced by EFKA Chemicals Co., Ltd.). The content in the case of using a pigment dispersing agent can be appropriately selected depending on the pigment to be contained and 5 parts by mass or more and 200 parts by mass or less with respect to 100 parts by mass of the content of the pigment in the ink composition is preferable, and 30 parts by mass or more and 120 parts by mass or less is more preferable.

1.2.5. Fixing Resin

The ink composition used in the present embodiment may contain a fixing resin for fixing the coloring material described above to the recording medium.

Examples of the fixing resins include acrylic resin, styrene-acrylic resin, rosin-modified resin, phenol resin, terpene resin, polyester resin, polyamide resin, epoxy resin, vinyl acetate resin, vinyl chloride resin, and fiber-based resins such as cellulose acetate butyrate, vinyl toluene-α-methyl styrene copolymer resins, and the like. Among these, it is preferable that the fixing resin be at least one type of resin selected from the group formed of acrylic resin and vinyl chloride resin, more preferably a vinyl chloride resin. Containing these fixing resins makes it possible to improve the fixability to the recording medium and the scratch resistance is also improved.

It is preferable that the solid content of the fixing resin in the ink composition used in the present embodiment be 0.05 mass % or more and 15 mass % or less, more preferably 0.1 mass % or more and 10 mass % or less, and even more preferably 1 mass % or more and 5 mass % or less. When the content of the fixing resin is the above range, an excellent fixing property can be obtained with respect to the recording medium.

Acrylic Resin

Examples of the acrylic resin include (meth)acrylic monomers such as poly(meth)acrylate, polymethyl (meth)acrylate, polyethyl (meth)acrylate, (meth)acrylic acid-(meth) acrylic acid ester copolymer resin, styrene-(meth)acrylic copolymer resin, ethylene-(meth)acrylic acid copolymer resin, ethylene alkyl (meth)acrylate resin, ethylene-(meth) acrylate ester copolymer resin, or copolymer resins of the above and other monomers. These acrylic resins may be used alone or in a combination of a plurality of acrylic resins.

The acrylic resin may be a commercially available product and examples of such products include ACRYPET MF (product name, produced by Mitsubishi Rayon Co., Ltd., acrylic resin), SUMIPEX LG (product name, produced by Sumitomo Chemical Co., Ltd., acrylic resin), Paraloid B series (product name, produced by Rohm and Haas Co., Ltd., acrylic resin), Parapet G-1000P (product name, produced by Kuraray Co., Ltd., acrylic resin), and the like. Here, in the invention, "(meth)acrylic acid", means both acrylic acid and methacrylic acid and "(meth)acrylate" means both acrylate and methacrylate.

Vinyl Chloride Resin

Examples of the vinyl chloride resin include copolymers of vinyl chloride and other monomers such as vinyl acetate, vinylidene chloride, acrylic acid, maleic acid, and vinyl alcohol and among these, a copolymer including a structural unit derived from vinyl chloride and vinyl acetate (also referred to below as "vinyl chloride acetate copolymer") is preferable, and a vinyl chloride acetate copolymer with a glass transition temperature of 60 to 80° C. is more preferable.

The vinyl chloride acetate copolymer can be obtained by a normal method and can be obtained by suspension polymerization. In particular, after water, a dispersing agent, and a polymerization initiator were charged in a polymerization vessel and degassed, the vinyl chloride and vinyl acetate are pressed and suspension polymerization is performed, or a part of the vinyl chloride and the vinyl acetate are pressed to start a reaction, and suspension polymerization is performed while pressing the remaining vinyl chloride during the reaction.

It is preferable that the vinyl chloride acetate copolymer contain 70 to 90 mass % of vinyl chloride units as the composition of the copolymer. In range described above, the long-term storage stability is excellent since the vinyl chloride acetate copolymer is stably dissolved in the ink composition. Furthermore, the ejection stability is excellent and it is possible to obtain an excellent fixing property with respect to the recording medium.

In addition, the vinyl chloride acetate copolymer may be provided with other structural units as necessary in addition to a vinyl chloride unit and a vinyl acetate unit, and examples of such units include a carboxylic acid unit, a vinyl alcohol unit, a hydroxyalkyl acrylate unit, and the like, and particularly preferable examples include vinyl alcohol units. The vinyl chloride acetate copolymer can be obtained by using a monomer corresponding to each unit described above. Specific examples of monomers which provide the carboxylic acid units include maleic acid, itaconic acid, maleic anhydride, itaconic anhydride, acrylic acid, and methacrylic acid. Specific examples of monomers which provide the hydroxyalkyl acrylate unit include hydroxyethyl (meth)acrylate, hydroxyethyl vinyl ether, and the like. The content of these monomers is not limited as long as it does not impair the effects of the invention; however, it is possible to carry out copolymerization in a range of 15 mass % or less of the monomer total amount.

In addition, commercially available vinyl chloride acetate copolymers may be used and examples of such copolymers include SOLBIN CN, SOLBIN CNL, SOLBIN CSR, SOLBIN TA5R, SOLBIN CL, SOLBIN CLL (the above are produced by Nissin Chemical Industry Co., Ltd.), Kanevinyl HM515 (produced by Kaneka Corporation), and the like.

The average polymerization degree of these resins is not particularly limited, but is preferably from 150 to 1100, and more preferably from 200 to 750. In a case where the average polymerization degree of these resins is in the ranges described above, the resins are stably dissolved in the ink composition used in the present embodiment, which gives excellent long-term storage stability. Furthermore, the ejection stability is excellent and it is possible to obtain an excellent fixing property with respect to the recording medium. Here, the average polymerization degree of these resins is calculated by measuring the specific viscosity and using the result and can be calculated according to the average polymerization degree calculation method according to "JIS K6720-2".

In addition, the number-average molecular weight of these resins is not particularly limited and is preferably 10,000 to 50,000, and more preferably 12,000 to 42,000. Here, the number-average molecular weight may be measured by GPC and can be obtained as a relative value by polystyrene conversion.

1.2.6. Surfactant

From the point of view of improving the wettability with the recording medium by reducing the surface tension, silicon-based surfactants, fluorine-based surfactants, or polyoxyethylene derivatives which are non-ionic surfactants may be added to the ink composition used in the present embodiment.

As the silicon-based surfactant, it is preferable that polyester-modified silicon or polyether-modified silicon be used. Specific examples include BYK-315, 315N, 347, 348, BYK-UV3500, 3510, 3530, and 3570 (all produced by BYK Japan Co., Ltd.) and the like.

As the fluorine-based surfactant, it is preferable that a fluorine-modified polymer be used and specific examples of such polymers include BYK-340 (produced by BYK Japan Co., Ltd.).

In addition, as the polyoxyethylene derivative, it is preferable that an acetylene glycol surfactant be used. Specific examples of such surfactants include Surfynol 82, 104, 465, 485, and TG (all produced by Air Products Japan, Inc.), Olfine STG, and E1010 (both produced by Nissin Chemical Industry Co., Ltd.), Nissan Nonion A-10R and A-13R (both produced by NOF Corporation), Flowlen TG-740W, D-90 (produced by Kyoeisha Chemical Co., Ltd.), Noigen CX-100 (produced by Dai-ichi Kogyo Seiyaku Co., Ltd.), and the like.

It is preferable that the content of the surfactant in the ink composition used in the present embodiment be 0.05 mass % or more and 3 mass % or less, more preferably 0.5 mass % or more and 2 mass % or less, and still more preferably 1 mass % or more and 1.5 mass % or less.

1.2.7. Other Components

It is possible to add substances for imparting a predetermined performance to the ink composition used in the present embodiment as necessary such as a pH adjusting agent, chelating agents such as ethylene diamine tetraacetic acid salt (EDTA), antiseptic and antifungal agents, anti-rust agents, and the like.

1.2.8. Preparation Method of Ink Composition

The ink composition used in the present embodiment is obtained by mixing the components described above in an arbitrary order and removing impurities by filtration or the like as necessary. As a method of mixing the respective components, it is preferable that a method of stirring and mixing the sequentially added materials in a container provided with a stirring apparatus such as a mechanical stirrer or a magnetic stirrer be used. As a filtration method, centrifugal filtration, filter filtration, or the like can be performed as necessary.

1.2.9. Physical Properties of Ink Composition

From the point of view of the balance between the recording quality and the reliability as ink for ink jet recording, it is preferable that the ink composition used in the present embodiment have a surface tension at 20° C. of 20 mN/m or more and 50 mN/m or less, more preferably 25 mN/m or more and 40 mN/m or less. Here, the surface tension can be measured by confirming the surface tension when a platinum plate is wetted with ink in an environment of 20° C. using an automatic surface tension meter CBVP-Z (manufactured by Kyowa Interface Science Co., Ltd.).

In addition, from the same point of view, it is preferable that the viscosity of the ink composition at 20° C. be 2 mPa·s or more and 15 mPa·s or less, more preferably 2 mPa·s or more and 10 mPa·s or less. Here, the viscosity can be measured by increasing the shear rate from 10 to 1000 under an environment of 20° C. and reading the viscosity at the time of a shear rate of 200 using a Viscoelastic Tester MCR-300 (manufactured by Pysica Co., Ltd.).

1.2.10. Recording Medium

By the ink composition according to the present embodiment being a solvent ink including the solvent which is the compound represented by General Formula (1) described above, the image quality when recording on an ink low-absorbing or non-absorbing recording medium, for example, a film media such as a vinyl chloride-based recording medium, is excellent and thus particularly suitable for sign applications and the like exhibited outdoors.

Here, the "ink low-absorbing or non-absorbing recording medium" in the present specification indicates a recording medium which has a property of absorbing absolutely none of the ink composition or of absorbing hardly any of the ink composition. In terms of quantity, the ink low-absorbing or non-absorbing recording medium indicates a "recording medium where the water absorption amount is 10 mL/m² or less from contact start to 30 msec^{1/2} in the Bristow method". The Bristow method is the most prevalent method for measuring the liquid absorption amount in a short time and is adopted by the Japan Technical Association of the Pulp and Paper Industry (JAPAN TAPPI). The details of the test method are described in "Paper and Paperboard-Liquid Absorbency Test Method, Bristow method" Standard No. 51 of "JAPAN TAPPI Paper Pulp Test Method 2000 edition". In contrast, an ink absorbent recording medium indicates a recording medium which does not correspond to the non-ink absorbing or low absorption recording medium.

Examples of a non-ink absorbing recording medium include a plastic film which does not have an ink absorbing layer, a medium where a substrate such as paper is coated with plastic, a medium adhered to a plastic film, and the like. Here, examples of the plastic include polyvinylchloride, polyethylene terephthalate, polycarbonate, polystyrene, polyurethane, polyethylene, polypropylene, and the like. As long as the vinyl chloride recording medium contains the vinyl chloride resin, the recording medium is not particularly limited. Examples of the recording medium which contains a vinyl chloride resin used in sign applications and the like include a soft or hard vinyl chloride film or sheet, and the like.

Examples of the low low-absorbing recording medium include a recording medium provided with a coating layer for receiving ink on the surface and, in a case where the substrate is paper, examples include printing paper such as art paper, coating paper, and matte paper, and, in a case where the substrate is a plastic film, examples include films where a hydrophilic polymer is applied on the surface such as polyvinylchloride, polyethylene terephthalate, polycarbonate, polystyrene, polyurethane, polyethylene, or polypropylene, and examples also include films where particles such as silica or titanium are coated with a binder. These recording media may be transparent recording media.

1.2.11. Effect

By the ink composition used in the present embodiment being a solvent ink including a solvent which is the compound represented by General Formula (1) described above as 30 mass % or more, it is possible to increase the solid content of the ink composition, the image quality when recording on film media such as a vinyl chloride recording medium is excellent and recorded material with excellent print characteristics such as scratch resistance and surface drying characteristics is obtained, which is thus particularly suitable for sign applications and the like exhibited outdoors. In addition, the ink composition used in the present embodiment is an ink which dries relatively easily and, by ejecting using a print head where the length of the connection portion is 500 μm or more, the drying of the ink from the nozzle surface is prevented and the ejection stability is excellent over long periods in an ink jet recording method using this ink.

Next, a description will be given of the ink adhesion step and the heating step in the ink jet recording method according to the present embodiment.

1.3. Ink Adhesion Step

The ink adhesion step according to the present embodiment is a step for adhering the ink composition to a recording medium using a print head including a nozzle which ejects the ink composition described above; and a pressure chamber for ejecting the ink composition from the nozzle by applying pressure to the ink composition, in which the length of the connection portion from a portion of the pressure chamber from which ink flows out to the nozzle side up to the nozzle is 500 μm or more.

The recording medium for adhering the ink composition is not particularly limited; however, in a case of using the ink composition described above, an ink jet recording method is provided which obtains recorded material with excellent ejection stability and excellent print characteristics when adhering ink at the time of recording on film media such as the vinyl chloride-based recording medium described above.

In an ink ejection step, it is preferable that the recording resolution be 300×300 dpi or more, more preferably 5000× 5000 dpi or less. In addition, it is preferable that the maximum mass per ink droplet in the ink ejection be 30 ng or less. Here, the ink amount in one droplet in the ejection is the mass of a single ejection (one shot) and not the total number of ejections. In the ink adhesion step according to the present embodiment, by the maximum mass per ink droplet in the ink ejection being 30 ng or less, the liquid droplets are reduced in size and it is possible to obtain recorded material with excellent print characteristics. It is preferable that the maximum mass per ink droplet be 25 ng or less, more preferably 20 ng or less, even more preferably 15 ng or less, and yet more preferably 10 ng or less. It is preferable that the lower limit of the maximum mass per ink droplet be 1 ng or more, more preferably 3 ng or more, and even more preferably 5 ng or more. Here, in a case where the recording resolution is high, smaller ink ejection amounts obtain recorded material with superior print characteristics, which is preferable.

In addition, in the ink adhesion step, it is preferable that the maximum coating amount of the ink on the recording medium be 30 ng/inch² or less. By setting the maximum coating amount on the recording medium to 30 ng/inch² or less, recorded material with excellent print characteristics is obtained. It is more preferable that the maximum ink coating amount on the recording medium be 20 ng/inch² or less, more preferably 10 ng/inch² or less. In addition, it is preferable that the lower limit of the maximum ink coating amount on the recording medium be 1 ng/inch² or more, more preferably 5 ng/inch² or more.

As described above, by using a print head where the length of the connection portion from the portion of the pressure chamber where the ink flows out from the pressure chamber to the nozzle side up to the nozzle is 500 μm or more, it is possible to provide an ink jet recording method with excellent ejection stability by preventing the drying of ink from the nozzle surface when a solvent-based ink is applied to the recording medium with an ink jet method. In addition, since it is possible to preserve the ejection stability at the time of ink adhesion, it is possible to increase the solid content of the ink composition, and it is possible to provide an ink jet recording method in which recorded material with excellent printing characteristics such as scratch resistance or surface drying characteristics is obtained.

1.4. Heating Step

It is preferable that the ink jet recording method according to the present embodiment include a heating step for heating the recording medium such that the surface temperature of the recording medium is 30° C. or higher during the ink adhesion step. Providing the heating step makes it possible to quickly form a recorded image or the like by quickly evaporating and scattering the solvent in the ink adhered to the recording medium. As long as the means for heating the recording medium is provided with a configuration promoting the evaporation and scattering of the solvent included in the ink, there is no particular limitation. Examples of a means for heating the recording medium include an infrared ray (lamp). It is preferable that the temperature of the heated recording medium be 40° C. or higher and 70° C. or lower, and more preferably 50° C. or higher and 60° C. or lower.

2. EXAMPLES

A more detailed description will be given below of the invention using Examples and Comparative Examples; however, the invention is not limited only to these Examples. Here, "parts" and "%" in the examples and comparative examples are based on mass unless otherwise specified.

2.1. Preparation of Solvent-Based Ink Composition

Using the coloring material and the dispersing agent described in Table 1, a dispersion solution was prepared by changing the added amount of the dispersing agent in a range of 67 to 200 mass % with respect to 100 parts by mass of the pigment and dispersing the pigment. As the dispersion medium, a pigment dispersion solution was set using the solvent with the highest content as the solvent for each of the ink composition examples as the dispersion medium. After mixing the pigment dispersion solution prepared as described above and the components described in Table 1 and mixing and stirring for two hours in a magnetic stirrer, further filtering was carried out using a membrane filter with a pore size of 5 μm, and the solvent-based ink compositions of composition 1 to composition 10 were obtained. Here, the numerical values in Table 1 represent the content (by mass %) in the solvent-based ink composition.

TABLE 1

| Material | | Flash point | Composition 1 | Composition 2 | Composition 3 | Composition 4 | Composition 5 |
|---|---|---|---|---|---|---|---|
| Coloring material | C.I. Pigment Blue 15:3 | — | 4 | 4 | 4 | 4 | 4 |
| Dispersing agent | Solsperse 37500 | — | 4 | 4 | 4 | 4 | 4 |
| Lactone | γ-butyrolactone | 98 | — | — | 15 | — | — |
| | σ-valerolactone | 112 | 15 | 15 | — | 15 | — |
| Solvent | DEGMEE (MEDG) | 64 | — | — | 40 | — | — |
| | DEGdME | 56 | — | — | 29 | 40 | — |
| | DEGdEE (DEDG) | 70.8 | 40 | 40 | — | 34 | 54 |
| | DEGBME | 94 | 29 | 24 | — | — | 30 |
| | TetraEGmBE (single body) | 156 | 5 | 5 | 5 | — | 5 |
| | Equamide M100 (amide-based solvent) | 93 | — | 5 | — | — | — |
| | AF solvent No. 7 (napthene-based hydrocarbon solvent) | 128 | — | — | — | — | — |
| | Isooctyl palmitate (ester-based solvent) | 203 | — | — | — | — | — |
| | Salacos 99 (ester-based solvent) | 148 | — | — | — | — | — |
| Surfactant | BYK340 | — | 1.5 | 1.5 | 1.5 | 1.5 | 1.5 |
| Fixing resin | Solbin CL | — | 1.5 | 1.5 | 1.5 | 1.5 | 1.5 |
| Total | | | 100.0 | 100.0 | 100.0 | 100.0 | 100.0 |

| Material | | Composition 6 | Composition 7 | Composition 8 | Composition 9 | Composition 10 |
|---|---|---|---|---|---|---|
| Coloring material | C.I. Pigment Blue 15:3 | 4 | 4 | 4 | 4 | 4 |
| Dispersing agent | Solsperse 37500 | 4 | 4 | 4 | 4 | 4 |
| Lactone | γ-butyrolactone | 15 | — | — | 10 | 15 |
| | σ-valerolactone | — | — | 15 | — | — |

TABLE 1-continued

| | | | | | | |
|---|---|---|---|---|---|---|
| Solvent | DEGMEE (MEDG) | 40 | — | — | — | 20 |
| | DEGdME | 30.5 | — | — | — | 25 |
| | DEGdEE (DEDG) | — | — | — | — | — |
| | DEGBME | — | — | — | 10 | — |
| | TetraEGmBE (single body) | 5 | — | — | — | 5 |
| | Equamide M100 (amide-based solvent) | — | — | — | — | — |
| | AF solvent No. 7 (napthene-based hydrocarbon solvent) | — | 50 | 20 | 40 | 15 |
| | Isooctyl palmitate (ester-based solvent) | — | 39 | — | — | — |
| | Salacos 99 (ester-based solvent) | — | 39 | 54 | 29 | 9 |
| Surfactant | BYK340 | 1.5 | 1.5 | 1.5 | 1.5 | 1.5 |
| Fixing resin | Solbin CL | — | 1.5 | 1.5 | 1.5 | 1.5 |
| | Total | 100.0 | 139.0 | 100.0 | 100.0 | 100.0 |

The main materials of the ink composition used in Table 1 are as follows.
Coloring Material
C. I. Pigment Blue 15:3
Dispersing Agent
Solsperse 37500: Product Name, produced by Lubrizol Corp., Polyester polyamide resin
Lactone
γ-butyrolactone: product name, produced by Kanto Chemical Co., Inc.
σ-valerolactone: product name, produced by Kishida Chemical Co., Ltd.
Solvent
DEGMEE: diethylene glycol methyl ethyl ether, product name, "Hysorb EDM", produced by Toho Chemical Industry Co., Ltd., flash point 64° C.
DEGdME: diethylene glycol dimethyl ether, product name "diethylene glycol dimethyl ether", produced by Tokyo Chemical Industry Co., Ltd., flash point 56° C.
DEGdEE: diethylene glycol diethyl ether, product name "diethylene glycol diethyl ether", produced by Tokyo Chemical Industry Co., Ltd., flash point 70.8° C.
DEGBME: diethylene glycol butyl methyl ether, product name "Hysorb BDM", produced by Toho Chemical Industry Co., Ltd., flash point 94° C.
TetraEGmBE: tetraethylene glycol monobutyl ether, product name "Butysenol 40", produced by KH Neochem Co., Ltd., flash point 156° C.
TriEGdME: triethylene glycol dimethyl ether, product name "triethylene glycol dimethyl ether", produced by Kishida Chemical Co., Ltd., flash point 111° C.
DPGmME: dipropylene glycol monomethyl ether, product name "methyl propylene diglycol" produced by Nippon Nyukazai Co., Ltd., flash point 76.5° C.
Equamide M100: product name, produced by Idemitsu Kosan Co., Ltd., amide-based solvents, flash point 93° C.
AF Solvent No. 7: product name, produced by JX Nippon Oil & Energy Corporation, naphthenic hydrocarbon solvent, flash point 128° C.
Isooctyl palmitate: product name "IOP", produced by Nippon Fine Chemical Co., Ltd., ester-based solvent, flash point 203° C.
Salacos 99: product name, produced by Nisshin OilliO Group, Ltd., isononyl isononanoate (ester-based solvent), flash point 148° C.
Surfactant
BYK340 (product name, produced by BYK Japan Co., Ltd., fluorine-based surfactant)
Fixing Resin
Solbin CL: product name, produced by Nissin Chemical Industry Co., Ltd., vinyl chloride vinyl acetate copolymer 2.2. Preparation of Ink Jet Recording Apparatus As the ink jet recording apparatus provided with a print head illustrated in FIG. 2 to FIG. 4 described above, a modified apparatus of a SC-S30650 (manufactured by Seiko Epson Corporation) was prepared. As the print heads, four types of heads of H1 to H4 shown in Table 2 were used. Here, the used ink jet recording apparatus was provided with a platen heater and, in the examples other than Example 12, the platen heater was activated at the time of ink ejection and set to heat the surface temperature of the recording medium up to 40° C.

TABLE 2

| | Print head No. | | | |
|---|---|---|---|---|
| | H1 | H2 | H3 | H4 |
| Length from pressure chamber to nozzle surface [μm] | 1000 | 100 | 1000 | 500 |
| Nozzle pitch [dpi] | 300 | 360 | 180 | 300 |
| Volume of pressure chamber [pl] | 2900 | 2900 | 3700 | 2900 |
| Total volume of nozzle hole, communication hole, and pressure chamber [pl] | 4200 | 3100 | 5000 | 3600 |

Here, the head H1 has the structure shown in FIG. 3 and the length from the bottom surface of the pressure chamber 20 to the nozzle surface 13, that is, the thickness (d1+d2) of the connection portion 132 is 1000 μm and the nozzle pitch (nozzle density) is 300 dpi. Here, the volume of the pressure chamber 20 is 2900 pl and the total volume of the communication hole 127, the nozzle hole 12, and the pressure chamber 20 is 4200 pl.

Figure 4:
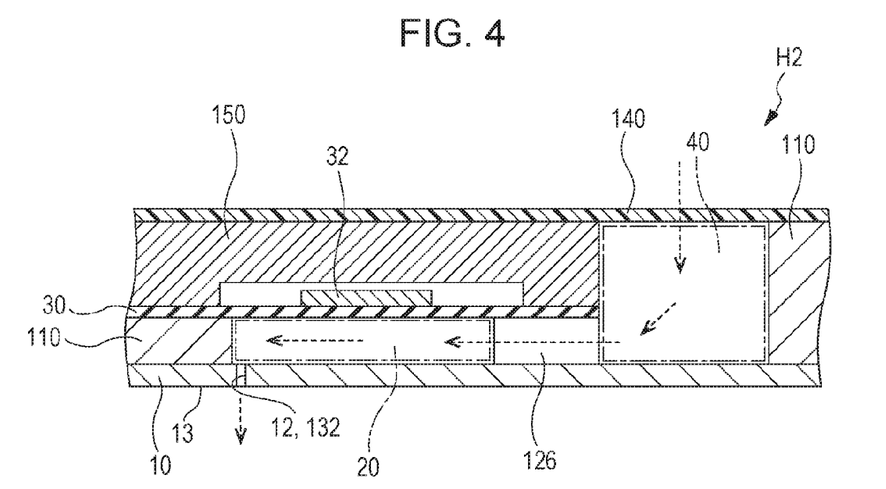
FIG. 4 is a schematic view of a cross-section of a main portion of a head of a comparative example.

The head H2 has the structure shown in FIG. 4. That is, the print head H2 shown in FIG. 4 is not provided with a communication hole and the pressure chamber 20 is indicated by a space partitioned by the nozzle plate 10, the communication plate 110, and the vibration plate 30 and refers to a space in which the nozzle hole 12 and the supply port 126 are not included. In the head H2, the length from the bottom surface of the pressure chamber 20 to the nozzle surface 13, that is, the length of the connection portion 132, is the length of the nozzle hole 12 and is equal to the thickness of the nozzle plate 10, which is 100 μm, and the nozzle pitch is 360 dpi. Here, the volume of the pressure chamber 20 is 2900 pl and the total volume of the nozzle holes 12 and the pressure chamber 20 is 3100 pl.

The head H3 is a head with a structure similar to the head H1, but the pressure chamber volume is greater than the head H1 and the nozzle density is lower. That is, the length of the connection portion 132 is 1000 μm, the nozzle pitch is 180 dpi, the volume of the pressure chamber 20 is 3700 pl, and the total volume of the communication hole 127, the nozzle hole 12, and the pressure chamber 20 is 5000 pl.

The head H4 is a head with a structure similar to the head H1, the length of the connection portion 132 is 500 μm which is shorter than head H1, but the volume of the nozzle pitch and the pressure chamber 20 is the same as the head H1. That is, the nozzle pitch is 300 dpi, the volume of the pressure chamber 20 is 2900 pl, and the total volume of the communication hole 127, the nozzle hole 12, and the pressure chamber 20 is 3600 pl since the length of the connection portion 132 is shorter than the head H1. Here, in any of the heads, the nozzle diameter of the nozzle holes 12 is 20 μm.

2.3. Evaluation Test 2.3.1. Evaluation of Intermittency

Using each ink composition of composition 1 to composition 10 in the ink jet recording apparatus provided with any of the heads H1 to H4, an intermittency evaluation test assuming long-term use was performed. In the evaluation test, after the ejection of the ink to an ink receiver provided on the platen side from the head was performed continuously for five minutes and the heads were left to stand for 100 minutes, five sets of continuous ejection for five minutes and being left to stand for 100 minutes were performed. After finishing, an inspection of non-ejecting nozzles was performed, the number of non-ejecting nozzles with respect to the total number of nozzles used was calculated, and the evaluation was carried out on the following basis. Here, the ink amount per ink droplet was 15 ng in Example 11 and was otherwise 7 ng in all cases.

Evaluation Criteria

B: Ejection failure was less than 1%
C: Ejection failure was 3% or more and less than 5%
X: Ejection failure was 5% or more 2.3.2. Evaluation of Abrasion Resistance of Recorded material Using an ink jet recording apparatus provided with any of the heads H1 to H4 and using each ink composition, recorded material was produced by solid printing with a coating amount of 10 ng/inch$^2$ and at a recording resolution of 1440×1440 ddpi on a vinyl chloride media which is the recording medium (product name "IMAJIN JT 5829R" produced by Mactac). The obtained recorded material was dried for 1 day at 25° C., 65% RH (relative humidity). After that, using a Japan Society for the Promotion of Science type color fastness rubbing tester AB-301 (manufactured by Tester Sangyo Co., Ltd.), under conditions of a load of 1 kg and 30 instances of friction, a friction element with an attached white cotton cloth for friction (calico No. 3) and the image were rubbed together, the surface state of the image was observed visually, and evaluation was carried out according to the following criteria. The evaluation criteria were as follows.

Evaluation Criteria

B: Scratches were not confirmed on the surface.
C: Some scratches were observed on the surface.
D: Many scratches were confirmed on the surface.

2.3.3. Evaluation of Surface Drying Characteristics of Recorded Material

Recorded material obtained under the same conditions as "2.3.2." above was dried for five minutes. Next, smudges on the recording surface were observed after winding the vinyl chloride media using a winding apparatus. In the observation of the smudges, the ratio of the area of the smudges was calculated by measuring the surface roughness using a shape measurement laser microscope (manufactured by Keyence, "VK-8700"). The evaluation criteria were as follows.

Evaluation Criteria

B: Smudged area was less than 10%
C: Smudged area was 10% or more and less than 20%
D: Smudged area was 20% or more 2.3.4. Evaluation of Line Width of Recorded Material Recorded material was produced in the same manner as "2.3.2." described above except that a line of the p line width of 10 μm extending in the sub-scanning direction of the head was recorded. The printing portion of the obtained recorded material was observed with a loupe (5×) and the line width was evaluated according to the following evaluation criteria.

Evaluation Criteria

A: Contour lines were formed continuously in a certain shape and in a straight line.
B: Contour lines were formed continuously in a certain shape, but not in a shape close to a straight line.
C: Contour lines were not formed in a certain shape, but breaks were not seen.
D: Portions with line breaks were seen.

2.4. Evaluation Results

The evaluation results of each of the Examples and Comparative Examples are shown in Table 3.

TABLE 3

|  | Example 1 | Example 2 | Example 3 | Example 4 | Example 5 | Example 6 | Example 7 | Example 8 | Example 9 |
| --- | --- | --- | --- | --- | --- | --- | --- | --- | --- |
| Ink composition | Composition 1 | Composition 2 | Composition 3 | Composition 4 | Composition 5 | Composition 6 | Composition 2 | Composition 3 | Composition 1 |
| Print head No. | H1 | H1 | H1 | H1 | H1 | H1 | H3 | H3 | H4 |
| Intermittency | B | B | C | C | B | B | B | C | C |

TABLE 3-continued

|  |  |  |  |  |  |  |  |  |  |
|---|---|---|---|---|---|---|---|---|---|
| Scratch resistance | B | B | B | B | C | x | B | B | B |
| Surface drying characteristics | C | C | B | B | C | B | C | B | C |
| Line width | B | B | B | C | C | B | C | C | B |

|  | Example 10 | Example 11 | Example 12 | Comparative Example 1 | Comparative Example 2 | Comparative Example 3 | Comparative Example 4 | Comparative Example 5 | Comparative Example 6 |
|---|---|---|---|---|---|---|---|---|---|
| Ink composition | Composition 10 | Composition 3 | Composition 3 | Composition 1 | Composition 4 | Composition 7 | Composition 8 | Composition 9 | Composition 8 |
| Print head No. | H1 | H1 | H1 | H2 | H2 | H1 | H2 | H2 | H1 |
| Intermittency | B | B | B | x | x | C | B | C | C |
| Scratch resistance | C | — | C | B | B | C | C | C | C |
| Surface drying characteristics | C | — | C | C | C | x | x | x | x |
| Line width | B | — | B | B | C | B | B | B | B |

As is clear from the results in Table 3, all of Examples 1 to 12 had excellent intermittency results. For the evaluation of the recorded material, the evaluation of all of Example 1 to Example 5 was satisfactory. In Example 5, due to the ink of composition 5 not including a lactone, the results of the print characteristics of the obtained recorded material were somewhat inferior. In Example 6, since the used ink of composition 6 did not include the fixing resin, the obtained recorded material had inferior scratch resistance results. In Examples 7 and 8, due to the nozzle pitch of the used head H3 being lower than H1 and filling and recording being carried out by increasing the number of passes in order to fill the gaps, the ink landing position was shifted and the line width results were inferior in comparison with Examples 2 and 3. In addition, in Example 9, since the length from the pressure chamber of the used head H4 up to the nozzle surface is shorter than the head H1, the intermittency results were inferior in comparison with Example 1. In Example 10, in comparison with the other Examples, the content of the glycol ethers in the ink was low and a large amount of a solvent with a high flash point was included. For this reason, the ink did not dry easily and the intermittency at the time of ejection was good; however, on the other hand, the surface drying characteristics were inferior and thus the scratch resistance results were inferior. In Example 11, since the intermittency evaluation was performed with an ink amount of 15 ng per ink droplet, Example 11 was not suited for high resolution (high image quality) pixel recording and it was not possible to evaluate the recorded material. In Example 12, since the platen heater was turned off and the recording was carried out without heating, the temperature of the recording medium during recording was 25° C. For this reason, the intermittency at the time of ejection was improved; however, the results for the scratch resistance and the surface drying characteristics of the recorded material were inferior.

In contrast, in Comparative Examples 1 and 2 using head H2 where a communication hole was not provided and the length from the pressure chamber up to the nozzle surface was short, the ink dried from the nozzle surface and the intermittency results were inferior. In Comparative Examples 3 and 6, the print head H1 was used and since glycol ethers were not included and the flash point of the main solvent of the used ink composition was high, the results for the intermittency and the scratch resistance and the surface drying characteristics of the recorded material were inferior in comparison with Examples 1 and 2. In Comparative Example 4 and 5, the head H2 was used and since the flash point of the main solvent of the used ink composition was high, the intermittency was excellent in comparison with Comparative Examples 1 and 2, but the results for the scratch resistance and the surface drying characteristics of the recorded material were inferior.

In this manner, it is clear that, by combining the heads and the ink included in the range of the invention, the drying of the ink from the nozzle surface is prevented and the intermittency at the time of ink adhesion is excellent and recorded material with excellent print characteristics is obtained. In this manner, the solid content and intermittency are typically in conflict; however, it is clear that, according to the ink jet recording method with excellent intermittency according to the invention, it is possible to increase the solid content of the ink and to improve the print characteristics such as the scratch resistance and the surface drying characteristics of the recorded material.

The invention is not limited to the embodiments described above and various modifications are possible. For example, the invention includes configurations substantially the same as the configurations described in the embodiments (for example, configurations with the same functions, methods, and results, or configurations with the same object and effects). In addition, the invention includes configuration in which portions which are not essential to the configurations described in the embodiments are substituted. In addition, the invention includes configurations which exhibit the same operation and effects as the configurations described in the embodiments or configurations which are able to achieve the same object. In addition, the invention includes configurations in which known techniques are added to the configurations described in the embodiments.

The entire disclosure of Japanese Patent Application No. 2015-239990, filed Dec. 9, 2015 is expressly incorporated by reference herein.

What is claimed is:

1. An ink jet recording method comprising:
   causing ink to adhere to a recording medium by ejecting an ink composition by using a print head provided with a nozzle which ejects the ink composition,
   a pressure chamber for ejecting the ink composition from the nozzle by applying pressure to the ink composition, and
   a connection portion which connects the pressure chamber to the nozzle,
   wherein a length of the connection portion from a portion of the pressure chamber from which ink flows to the nozzle side up to the nozzle is 500 μm or more, and
   the ink composition includes a coloring material and a solvent including compounds represented by General Formula (1) below at 30 mass % or more with respect to a total mass of the ink composition, and one or more of the compounds of the solvent represented by General Formula (1) have a flash point of 70° C. or lower, and a content of the one or more compounds having the flash point of 70° C. or lower is 50 mass % or more with respect to the total mass of the ink composition, wherein, in General Formula (1), $R^1$ and $R^3$ each independently represent a hydrogen or an alkyl group with 1 to 5 carbon atoms, and at least one of $R^1$ and $R^3$ is an alkyl group with 1 to 5 carbon atoms, $R^2$ represents an alkylene group with 2 to 4 carbon atoms, and n represents an integer of 1 to 6.

2. The ink jet recording method according to claim 1, wherein the ink composition includes the solvent at 50 mass % or more, and the content of the one or more compounds having the flash point of 70° C. or lower is 60 mass % or more with respect to the total mass of the ink composition.

3. The ink jet recording method according to claim 1, wherein the ink composition further includes a lactone as a solvent.

4. The ink jet recording method according to claim 1, wherein the ink composition further includes a fixing resin.

5. The ink jet recording method according to claim 1, wherein the ink composition further includes an alkylene glycol monoether compound where any one of $R^1$ and $R^3$ is a hydrogen as the solvent represented by General Formula (1) described above.

6. The ink jet recording method according to claim 1, wherein the flash point is 70° C. or lower and 50° C. or greater.

7. The ink jet recording method according to claim 1, wherein the print head is provided with a plurality of nozzles for ejecting the ink composition in rows, and a nozzle density in a row direction is 200 dpi or more.

8. The ink jet recording method according to claim 1, wherein the ink ejection amount per single ejection is 30 ng or less.

9. The ink jet recording method according to claim 1, further comprising:
heating the recording medium such that a surface temperature of the recording medium is 30° C. or higher during the ink adhesion.

10. The ink jet recording method according to claim 1, wherein the one or more compounds having a flash point of 70° C. or lower include at least one of diethylene glycol methyl ethyl ether and diethylene glycol dimethyl ether.

11. The ink jet recording method according to claim 1, wherein the print head further comprises a supply path that connects an ink supply chamber to the pressure chamber in a direction that is the same as a direction in which the connection portion connects the pressure chamber to the nozzle.

* * * * *